May 20, 1969      E. J. SILVA      3,445,702
DYNAMOELECTRIC MACHINE STATOR YOKE WITH KEYED SALIENT POLES
Filed June 29, 1967
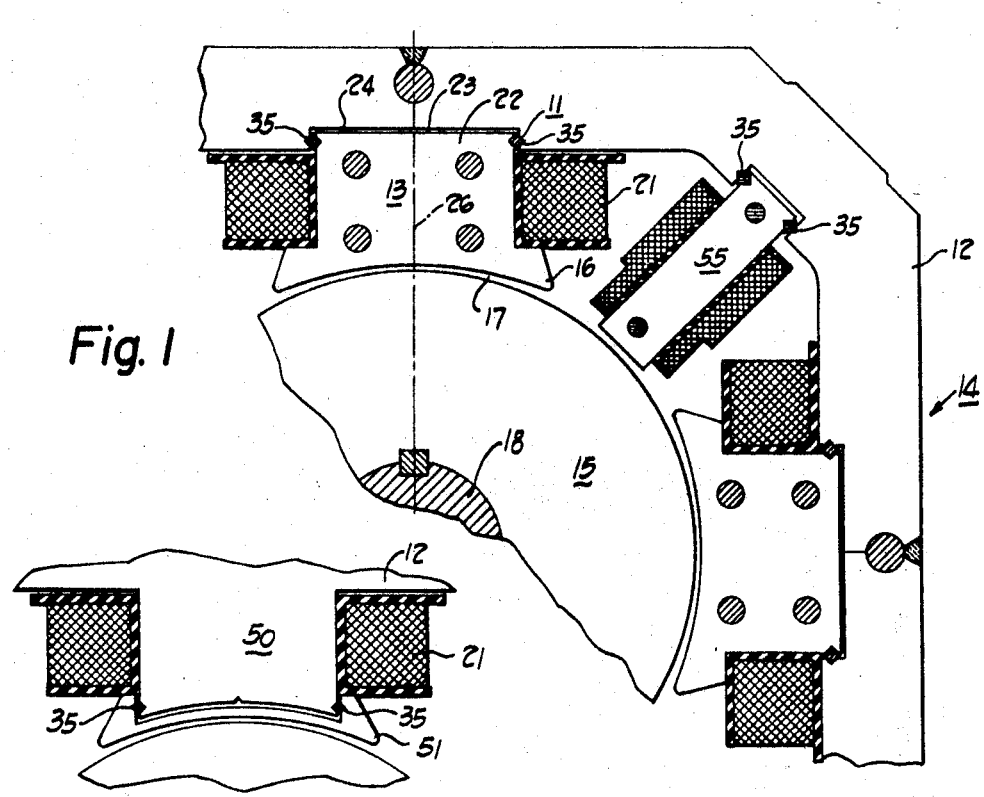
Fig. 1
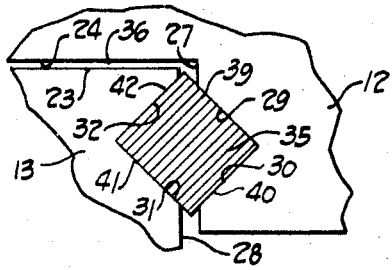
Fig. 5
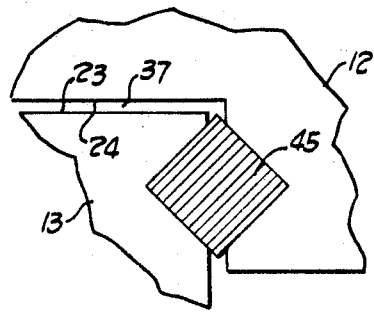
Fig. 2
Fig. 4
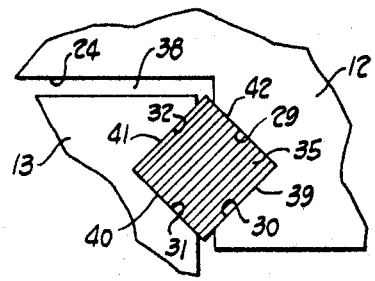
Fig. 3
INVENTOR.
EDMUND J. SILVA
BY Woodling, Krost,
Granger and Rust
ATTORNEYS.

United States Patent Office 3,445,702
Patented May 20, 1969

3,445,702
DYNAMOELECTRIC MACHINE STATOR YOKE WITH KEYED SALIENT POLES
Edmund J. Silva, Cleveland Heights, Ohio, assignor to The Reliance Electric and Engineering Company, a corporation of Ohio
Filed June 29, 1967, Ser. No. 650,120
Int. Cl. H02k 1/14, 19/26
U.S. Cl. 310—191            20 Claims

ABSTRACT OF THE DISCLOSURE

Rotatable rectangular keys are utilized for providing different air gaps between a dynamoelectric machine stator yoke and salient poles, interpoles, and pole shoes. As an example, these may be two metal members such as a pole piece and an annular yoke of a dynamoelectric machine frame. The parts are separable for easy insertion of a coil on the pole piece and are fastened together by a rectangular or square key. This key fits into V-shaped notches in each of the members and by varying the width to thickness ratio of the rectangular key, the two members may be fastened together in a plurality of differently spaced positions.

Background of the invention

The invention relates to two members as selectively fastened together. These members are illustrated as being two portions of a dynamoelectric machine frame, for example, a part of a pole piece and an annular yoke of the frame. The portion of the pole piece may be either the pole piece shank or a removable pole shoe. It has previously been suggested to fasten two portions of a dynamoelectric machine frame together utilizing two rectangular keys which are relatively thin relative to the width in the order of a 1 to 3 ratio. Such two keys were disposed in closely confining notches in each of the two members and the two keys were disposed generally perpendicularly to each other. Also each key was disposed at approximately at 45 degree angle relative to the parting line between the two members so as to prevent the two members from being pulled apart. In such case, the two members could be fastened together in only one relative position rather than in a plurality of relative positions.

In other prior constructions, the key means was a cylindrical key which fastened together two members by the key being insertable parallel to the length thereof. Again this permitted only a single relative position between the two members without any adjustment of relative position.

Other prior art constructions of fastening together two members, for example, fastening a pole shank onto an annular yoke of a dynamoelectric machine frame involved drilling and tapping holes in the two members and bolting the two members together. This requires machining operations to be performed on the two members adding time and labor to the operation and introducing variation in radial spacing of members which require further adjustment in order to obtain optimum performance of the machine. In a dynamoelectric machine frame, it is often desirable to slightly lengthen or shorten a pole piece in order to change the effective air gap between the pole tip and the rotor of the machine. In such case, it was common practice to use removable flat metal shims between the proximal end of the pole shank and the annular yoke. This required extra material for the shims and also required experimentation during assembly in order to provide the proper reluctance in the flux path as established by the variable air gap. This in turn necessitated considerable assembly and removal of the bolts fastening the pole shank to the annular yoke. This took considerable time and labor and added considerable expense to the cost of manufacture of the machine.

Accordingly an object of the invention is to provide a fastening means for two members which obviates the above-mentioned disadvantages.

Another object of the invention is to provide two members fastened together in a manner to permit minor adjustments in the effective air gaps between the magnetic yoke and rotor without disturbing mechanical air gap or fastening means.

Another object of the invention is to provide two members fastened together in a manner to permit rapid relative adjustment between the positions of the two members.

Another object of the invention is to provide rectangular key means which may be rotated 90 degrees and re-inserted in notches in two members in order to vary the relative position of the two members.

Another object of the invention is to provide polygonal key means insertable in an opening defined by surfaces of two members to provide at least two adjusted positions between the two members.

Summary of the invention

The invention may be incorporated in the combination of first and second members and fastening means therebetween, a surface defining a slot in said first member, a portion of said second member received in said slot and having an axis, said slot and said portion having opposing surfaces generally parallel to said axis, a notch in one of said opposing surfaces, said notch having first and second notch surfaces disposed at an angle to each other, said notch surfaces and a complementary portion of said opposing surface on the other member defining a polygonal opening, said fastening means including key means of polygonal cross section interengaging said members at said first and second notch surfaces, relative inward force parallel said axis between said members being transmitted through said key means and resisted by said first notch surface, relative outward force parallel to said axis between said members being transmitted through said key means and resisted by said second notch surface, and said polygonal opening being capable of receiving polygonal shaped key means of various ratios of mutually perpendicular transverse dimensions to vary the spacing between the proximal end of said second member portion and the adjacent slot surface of said first member, thereby affecting the air gap spacing between the pole shoe and the rotor.

Other objects and a fuller understanding of the invention may be had by referring to the following description and claims, taken in conjunction with the accompanying drawing.

Description of the drawing

FIGURE 1 is a partial cross sectional view of a dynamoelectric machine frame incorporating the invention in fastening together two members;

FIGURE 2 is a partial enlarged view illustrating a rectangular key fastening together two members;

FIGURE 3 is a view like FIGURE 2 but with the key rotated 90 degrees for a different adjusted position of the two members;

FIGURE 4 is a partial enlarged sectional view showing a square key fastening together the two members; and FIGURE 5 is a partial view illustrating a modification with the key means fastening together two different members.

Description of the preferred embodiment

FIGURE 1 illustrates the preferred fastening means 11 for first and second members. The first and second members are illustrated in this embodiment as an annular yoke member 12 and a pole piece means 13, both part of a frame assembly of a dynamoelectric machine 14. This machine 14 has a rotor 15 cooperating with the pole piece means 13 and more specifically, with a pole shoe 16 of the pole piece. There is an air gap 17 between the rotor 15 and the pole shoe 16. The rotor 15 may be fixed on a shaft 18 journalled in the machine 14.

A coil 21 surrounds the shank 22 of the pole piece 13 in order to establish flux in a path including part of the yoke member 12, pole piece means 13 and the rotor 15. If the coil 21 is wound in place on a fixed pole piece 13, then this adds to the complexity of manufacturing the machine 14. Accordingly, it is desirable to make either the pole shank 22 removable from the yoke 12 or to make the pole shoe removable from the pole shank, as in FIGURE 5, in order that the coil 21 may be separately wound as on a coil winding machine and then easily slipped in place on the pole shank.

The pole shank 22 has a proximal end 23 which is a projecting portion disposed in a slot 24 of the yoke member 12. The pole piece 13 has an axis 26 intersecting the center of the shaft 18 and generally radially of the machine 14. The slot 24 and the projecting end of the pole shank 22 have opposing surfaces 27 and 28, respectively. These are shown enlarged in FIGURES 2 to 4. These opposing surfaces are generally parallel to the axis 26. A notch defined by first and second notch surfaces 29 and 30 is disposed in the yoke member 12. Another notch defined by first and second notch surfaces 31 and 32 is disposed in the pole piece member 13. The four notch surfaces are each disposed in this preferred embodiment at generally a 45 degree angle relative to the axis 26. Also these four notch surfaces define a polygonal opening, in this case a rectangular or square opening. The fastening means 11 includes a key 35 which in FIGURES 2 and 3 is shown as being rectangular. The key is a polygonal key in cross section and has a length dimension which is long relative to the width and thickness dimensions which are shown in FIGURE 2 to 4. The length of such key 35 may be as long as the axial length of the pole shank 22 and is substantially parallel to the shaft 18 in order to be disposed in the notches so as to fasten the pole piece 13 to the yoke member 12.

The key 35 has opposing faces 39 and 41 which define the thickness dimension of this key. The key 35 also has opposing faces 40 and 42 which define the width dimension of this key. In FIGURE 2 the faces 39 and 41 engage the notch surfaces 29 and 31, respectively. Also faces 40 and 42 engage the notch surfaces 30 and 32, respectively. With this disposition of the key 35, the proximal end 23 of the pole piece 13 is closely spaced relative to the slot surface 24, to provide a small air gap 36.

In FIGURE 3 the key 35 has been removed by movement along the length thereof, rotated 90 degrees and reinserted between the two members 12 and 13. In such position, the thickness dimension faces 39 and 41 are in engagement with the notch surfaces 30 and 32, respectively. The width dimension faces 40 and 42 are in engagement with the notch surfaces 31 and 29, respectively. This moves the pole piece 13 outwardly relative to the slot surface 24 and thus establishes a large air gap 38 between these two members.

In FIGURE 4 a square key 45 of proper size is used to fasten together the two members 12 and 13, and it will be obvious that no matter in which of the four rotational positions this square key is inserted, it will always establish an intermediate size air gap 37 between the proximal end 23 of the pole piece 13 and the slot surface 24. Accordingly a polygonal shaped key 35 or 45 may be used to vary the air gap spacing or the adjusted positions between the members 12 and 13.

In the preferred embodiment of FIGURES 1 to 3, the rectangular key 35 establishes two adjusted positions between the first and second members 12 and 13, depending upon the attitude of positioning of this rectangular key. The notch surfaces 29–32 are each disposed at about a 45 degree angle relative to the axle 26 and relative to the opposing surfaces 27 and 28. Accordingly, selecting a different key with a changed thickness to width ratio of a given increment will achieve a change in air gap spaces 36 and 38 of approximately 1.414 times this incremental change. For example, in dynamoelectric machines which have a width of pole shank of approximately 4 inches, keys 35 and 45 of approximately 3/16 inch or 1/4 inch in transverse dimension are satisfactory. Assume a nominal dimension of .250 inch square of the square key 45, FIGURE 4. Now if this nominal dimension is varied by plus and minus .030 inch, then the rectangular key 35 would have a thickness of .220 inch and a width of .280 inch, a total difference of .060. Then when this rectangular key was inserted in the two possible positions of FIGURES 2 and 3, the air gaps 36 and 38 would be different by an amount equal to the incremental change of .060 inch times 1.414 or about .085 inch.

In the smaller size machine of a 4 inch wide pole shank 22, it may be desired to have an air gap between the rotor 15 and pole shoe 16 of .090, as a nominal air gap. It may be desired to vary this air gap by plus or minus .020 inch, namely from .070 to .110 inch. If one is using a square key 45 of .250 inch square dimensions, then the rectangular key 35 of FIGURES 2 and 3 would need to be varied by an increment of .014 inch. This would make the rectangular key 35 have a dimension of .236 inch by .264 inch. Another way of determining this desired incremental change, is to take the desired plus or minus variation of the nominal air gap, multiplied by .707 to arrive at the increment which is added to one dimension of the square and subtracted from the other dimension of the square to achieve the desired rectangle dimensions.

Where the pole shank 22 may be in the order of 7 inches in width, and the keys in the order of 1/2 inch square, then the nominal air gap between rotor 15 and pole shoe 16 may be .180 inch. In such case, it has been found that it may be desirable to shift the pole piece 13 by plus or minus .060 inch on each side of this nominal air gap. Accordingly, .060 times .707 equals .042 inch which is added ot and subtracted from the .500 dimension to arrive at .458 by .542 inch for the dimensions of the rectangular key 35. Then by the two different rotational positions of this rectangular key, as illustrated in FIGURES 2 and 3, one will obtain .120 inch or .240 inch air gap 17 between rotor 15 and pole shoe 16.

By selecting different rectangular keys of slightly different width to thickness dimensions, then two other adjusted positions of the two members 12 and 13 may be established.

FIGURE 5 illustrates a modification of the invention wherein the pole shank 50 is unitary with the yoke member 12. A removable pole shoe 51 is fastened to the pole shank 50 by the keys 35 or alternatively the keys 45. Again this modification of FIGURE 5 permits ready removal of part of the pole piece so that the coil 21 may be readily assembled on this pole piece.

In either embodiment of FIGURE 1 or FIGURE 5, the keys are readily inserted and removed even though the coil 21 is in place. This is because the coil, even though it completely surrounds the shank of the pole piece, does not cover the longitudinal ends of such keys. Accordingly, the ends of the keys are available so that a drive pin or similar tool may be used to drive the keys in or out and yet achieve a snug fitting pole piece assembly.

FIGURE 1 illustrates an interpole 55 which also is held in place by the keys 35 or alternatively the keys 45.

It will be noted that the key 35 or 45 is disposed in two notch surfaces in one member, for example, member 12. Relative inward force between the members 12 and 13 is transmitted through the key 35 and resisted by the first notch surface 29. It is also resisted by the first notch surface 31 of member 13. Relative outward force tending to separate members 12 and 13 is also transmitted through the key 35 and is resisted by the second notch surfaces 30 and 32. It will be noted that each of these notch surfaces has a component perpendicular to the direction of force which is parallel to the axis 26, and accordingly enables such forces to be resisted. By such resistance, the two members are effectively locked together and will not shift either inward or outward. This permits the air gap 36, 37 or 38 to be maintained without the necessity of a shim or shims completely filling such gap, as is the case with the prior art construction of the pole piece firmly bolted to the yoke member.

Shims may be used in the gaps 36, 37 or 38, in order to vary the effective air gap by varying the reluctance, however, it is not necessary to completely fill these gaps with shims, as in many prior art constructions, because the keys 35 or 45 securely lock the two members together, even without a completely filled gap.

The polygonal shape of the key is of the same size and shape as the polygonal opening defined by the notch surfaces. The two different relative positions of the two members 12 and 13, as illustrated in FIGURES 2 and 3 is accommodated by rotating the key 35 through an angle in this case 90 degrees.

FIGURE 1 shows that in the slot 24 there are two such keys 35, one on each side of the slot in order to lock in both sides of this pole piece 13. The keys 35 and 45 being square or rectangular have four corners each generally defined by substantially perpendicular faces and even though such corners may not be brought to a sharp edge, it is the faces generally adjacent the corners which interengage with the notch surfaces to firmly lock the two members together.

The keys may be of either a magnetic or a non-magnetic material as desired for the particular application. For example, the keys 35 used with the main pole piece 13 may be magnetically permeable in order to achieve the lowest possible reluctance to the flux path. Conversely, those keys used with the interpole 55 may be of non-magnetic material in order to force the flux to bridge the gap between the proximal end of such interpole and the slot in the yoke 12.

The keys 35 and 45 are polygons and in the case of the square key 45, a regular polygon. In the FIGURES 2, 3 and 4, it will be noted that there is a large area, 50 percent or more of the key faces which are in interengagement with the notch surfaces. This large area resists the relative inward and outward forces and thus keeps the key from twisting in the notches so that the two members are effectively locked together. The frame yoke 12 and pole piece 13 may be of laminated construction to readily form the notches by the stamping die and hence uniformity from one dynamoelectric machine frame to the next may be easily achieved. Accordingly commercial tolerance keys may be used. This is a saving in manufacturing cost over specially ground or rolled keys.

In FIGURES 2, 3 and 4, it will be noted that the keys 35 and 45 have only two contiguous faces in engagement with the notch surfaces in each particular member. This permits the 90 degree change in attitude between the key 35 in FIGURES 2 and 3 with the notch being able to accommodate these two different positional attitudes.

The locking together of the two members 12 and 13 is achieved by the relatively close spacing of the opposing surfaces 27 and 28. Preferably, this spacing is less than 20 percent of the minimum thickness of the key 35 or 45 in order to provide the large area of contact between the key and the notch surfaces. In addition, the thickness of the key 35 is in a range between 0.7 and 1.0 of the width of this key. This prevents the key from being thin and wide which might twist out of the notch and thus not lock the two members together.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and steps may be resorted to without departing from the spirit and the scope of the invention as hereinafter claimed.

What is claimed is:

1. In combination, first and second members and fastening means therebetween,
   a surface defining a slot in said first member,
   a portion of said second member received in said slot and having an axis,
   said slot and said portion having opposing surfaces generally parallel to said axis,
   a notch in one of said opposing surfaces,
   said notch having first and second notch surfaces disposed at an angle to each other,
   said notch surfaces and a complementary portion of said opposing surface on the other member defining a polygonal opening,
   said fastening means including key means of polygonal cross section interengaging said members at said first and second notch surfaces,
   relative inward force parallel to said axis between said members being transmitted through said key means and resisted by said first notch surface,
   relative outward force parallel to said axis between said members being transmitted through said key means and resisted by said second notch surface,
   and said polygonal opening being capable of receiving polygonal shaped key means of various ratios of mutually perpendicular transverse dimensions to vary the spacing between the proximal end of said second member portion and the adjacent slot surface of said first member.

2. The combination as set forth in claim 1 wherein said first and second members are parts of a dynamoelectric machine frame assembly with one part being an annular yoke member and the other being a part of pole piece means.

3. The combination as set forth in claim 1 including notch surfaces on each of said first and second members.

4. The combination as set forth in claim 1 wherein said notch surfaces interengage the key means over a large area relative to the transverse dimension of the key means to prevent twisting of the key means in resisting the relative inward or outward forces.

5. The combination as set forth in claim 4 wherein said interengaging surfaces have a component perpendicular to the direction of said relative inward and outward forces.

6. The combination as set forth in claim 5 wherein said interengaging surfaces are generally at a 45 degree angle relative to said axis.

7. The combination as set forth in claim 1 wherein said first and second members have different positions relative to each other to establish two different complementary polygonal openings of the same size and shape, and
   said key means has at least two alternative positions and received in the two different openings.

8. The combination as set forth in claim 7 wherein said two alternative positions of said key means are established by rotating said key means approximately 90 degrees.

9. The combination as set forth in claim 1 wherein said key means has four corners each generally defined by substantially perpendicular faces,
   a notch having first and second notch surfaces in each of said members, and the faces of said key means engaging said first and second notch surfaces of each of said members.

10. The combination as set forth in claim 9 wherein said key means is a single key and having two slightly different transverse dimensions between opposing faces of said key means.

11. The combination as set forth in claim 1 wherein the spacing between said opposing surfaces is less than twenty percent of the minimum thickness dimension of said key means.

12. The combination as set forth in claim 1 wherein the polygonal key means is of substantially the same size and shape as said polygonal opening.

13. The combination as set forth in claim 1 wherein the thickness of said key means is in a range between 0.7 and 1.0 in the width of said key means.

14. The combination as set forth in claim 1 wherein the polygonal key means has only two contiguous surfaces in engagement with said notch surfaces.

15. The combination as set forth in claim 1 including two notches in the first member and two notches in the second member,
   each notch on the first member being paired with a notch on the second member, and
   two keys, each disposed in one of the pairs of notches.

16. The combination as set forth in claim 1 including a notch in each of said members,
   said two notches being of substantially the same size, and
   said first and second members having two different relative positions so as to establish the polygonal opening defined by the two notches at two different attitudes but of the same size and shape to receive the key means in two different positions.

17. The combination as set forth in claim 1 including first and second notch surfaces on each of said members, each of said notch surfaces being disposed at generally a 45 degree angle relative to said axis, and
   said key means being a rectangular key in engagement with each of said first and second notch surfaces in each of the first and second members.

18. The combination as set forth in claim 1 wherein said key means is a single key of a regular polygonal cross section.

19. The combination as set forth in claim 2 wherein said pole piece means is a pole shank.

20. The combination as set forth in claim 2 wherein said pole piece means is a pole shoe.

References Cited

UNITED STATES PATENTS

| | | | |
|---|---|---|---|
| 1,929,787 | 10/1933 | Mudge | 310—218 |
| 2,308,028 | 1/1943 | Rose et al. | 310—218 |

FOREIGN PATENTS

| | | |
|---|---|---|
| 982,508 | 1/1951 | France. |
| 881,468 | 11/1961 | Great Britain. |

WARREN E. RAY, Primary Examiner.

U.S. Cl. X.R.

310—186, 192, 218